Sept. 24, 1968

H. NERWIN 3,402,812

SORTING APPARATUS FOR FILM CARTRIDGES

Filed Aug. 18, 1966

INVENTOR.
HUBERT NERWIN

ATTORNEYS

FIG.3

Sept. 24, 1968  H. NERWIN  3,402,812
SORTING APPARATUS FOR FILM CARTRIDGES
Filed Aug. 18, 1966  7 Sheets-Sheet 4

INVENTOR.
HUBERT NERWIN
ATTORNEYS

FIG. 7

Sept. 24, 1968       H. NERWIN       3,402,812
SORTING APPARATUS FOR FILM CARTRIDGES
Filed Aug. 18, 1966       7 Sheets-Sheet 7

INVENTOR.
HUBERT NERWIN
ATTORNEYS

United States Patent Office 3,402,812
Patented Sept. 24, 1968

3,402,812
SORTING APPARATUS FOR FILM CARTRIDGES
Hubert Nerwin, Rochester, N.Y., assignor to Eastman Kodak Company, Rochester, N.Y., a corporation of New Jersey
Filed Aug. 18, 1966, Ser. No. 573,347
14 Claims. (Cl. 209—80)

ABSTRACT OF THE DISCLOSURE

An apparatus for automatically identifying and sorting film cartridges each having identification notch means positioned at different locations within a selected peripheral distance along an edge of the cartridge. The cartridges are sequentially fed in identically oriented positions to and from a sensing station at which a plurality of sensing members move into engagement with the edge of the cartridge to sense the location of the notch therein. That sensing member which encounters a notch produces a characteristic signal which controls a sorting mechanism for allocating the cartridge to a particular one of a plurality of end positions to which it can move from said sensing station.

---

This invention relates to selecting and sorting apparatus. It is particularly useful as a mechanism for making appropriate selection and identification of film cartridges or magazine components containing various types of film prior to effecting processing of the film contained therein. The foregoing is one significant illustration of the utility of the proposal, although the principles herein to be described have wide fields of use in divergent sorting and selecting operations.

It is now customary for a user of picture film, following exposure of the film contained within the cartridge or magazine in which it is sold, to return the complete cartridge or magazine containing exposed film to a central point for processing and developing. This operation necessitates full identification of both the film cartridge and the film type therein so that the required processing may be achieved. For instance, a selection may show that the film is for color or black-and-white, and perhaps indicate the precise manner to develop and process. It also may show the particular film variety. In addition, it may show the film origin and manufacturer.

When exposed film is returned for processing, most of the work must be done in areas in which there is almost a complete absence of light. These are commonly called "darkrooms." This factor makes identification by visual inspection difficult, if not wholly impossible, at times. Further than this, since the film must be removed from the cartridge in which it is returned prior to the film processing, it is particularly important that each different type of cartridge or magazine should be sorted and segregated from each other type prior to opening. This insures less hazardous processing operations because it tends to preclude mixing of films. The automated form of sorting here to be described is usually faster and more accurate than sorting by eye.

Following sorting and allocation of the particular film types and, in some instances, identification of the manufacturer, the selected particular developing process best suited to the film contents may be carried on with minimum difficulty. A code identification media will permit allocation of each particular film type to a particular selected operation and thus, minimize chances for errors.

In some recently used film cartridges and magazines the code identification is established from a series of one or more notch or slot designations arranged in selected locations on one or more sides of the film cartridge or magazine. The notches usually indicate, as above suggested, the film type, as well as its processing requirements. Selection of one cartridge type from another is readily made with the present invention by feeding the cartridges along a conveyor mechanism with the cartridges all oriented in like relationship. The cartridges are moved, in one form of the invention, along the conveyor to a sensing station or region whereat the relative locations and/or the form of the notches or slots are sensed. Suitable signal indications are developed from the sensing operation to control moving the sensed film cartridge from the sensing station to the proper one of a plurality of collection points as determined by the particular notch locations, spacings, depths, widths, or the like which have been identified by the sensing. For conditions where relatively few film types are to be segregated, it is sufficient that the sensing station be able to identify the film cartridges solely by virtue of differences in the notch locations along the cartridge edge. It is readily possible to provide a substantial number of notches and still retain rapid selection possibilities.

In some instances, even a fairly large number of notches at chosen locations in the cartridge wall or edge are insufficient to provide within a reasonable distance an adequate number of selection choices for identification. Particularly in instances where many different types of film must be selected and where each film type requires a different developing or processing treatment, it is helpful to make the selections not only by virtue of sensing the different locations of the notches along the film cartridge, but also by sensing the depth or even the number of the notches within a selected location. Illustratively, if one assumes the possibility of $m$ different notch positions formed into the edge of the film cartridge and if, at the same time, these individual notches are cut to any one of several depths which can be identified as $n$, there will be available for sorting purposes as many different possible selections as result from the product of the $m$ different locations and the $n$ different depths. One suitable selection procedure might involve the choice of nine different notch locations (here represented by the factor $m$) and three different notch depths (represented by the factor $n$) which, under the circumstances, would provide for identifying $m$ times $n$ different cartridge types.

In practicing the invention here to be disclosed, film holding cartridges or magazines of like shape are fed from a suitable magazine, hopper or supply bin in identically oriented positions to move and come to rest upon a suitable conveyor. The cartridges are usually suitably spaced one from the other, although they may be transported when positioned adjacent to each other, depending upon the type of drive and conveyor motion selected. The positioning aligns the cartridges of the complete group one by one in a single file array. The cartridges are then later specifically identified by selecting means sensing the location of the film notch or notches on the cartridge wall, and, in some instances, also the notch depth or some other characteristic.

The selection of tre aligned cartridges with the notch or slot identifications all arranged at one side of the motional path of the conveyor, is achieved by arresting the motion of at least the leading cartridge of the file at a sensing station located at approximately the end of the conveyor path. In instances where the cartridges feed along a continuously moving conveyor belt, the leading cartridge is stopped momentarily at the sensing station while the remaining cartridges in the file path continue their motion along the belt. The sensing operation is performed on each leading cartridge of the series when its motion is arrested as it reaches the sensing station.

The arrest of the motional path of the cartridge is achieved by a gate mechanism adapted to open and close at appropriate times in a testing cycle. This gate is timed in its cyclic operation such that it releases promptly following testing for cartridge notch locations and (if necessary) notch depths or other characteristics. The opening of the gate permits continued cartridge movement subsequent to testing with the subsequent movement then being guided in accordance with the performed testing operation to allocate the cartridge to a particular one of a plurality of end positions. Promptly following the movement of the cartridge beyond the gate position, and prior to the arrival of the next succeeding cartridge at the sensing station, the gate is closed, after which the testing and sensing operation is continued as soon as the next cartridge reaches the sensing point.

The sensing and identification of the notches is usually achieved through the aid of a bank of feeler levers which are released by a suitable cycling control following the arrival of a cartridge at the sensing station. The bank of feeler levers is normally arranged adjacent to the conveyor file path along which the cartridges move. Sensing of the notch locations and other sought-for characteristics, if necessary, is achieved by permitting the levers to drop into the notch locations on the cartridge at selected time intervals. The levers are usually biased in a direction to cause them to move, upon release, into any cartridge notch aligned in space with them.

To permit a sensed cartridge to be moved away from the sensing position and a successive cartridge to be moved into sensory position, the levers are raised against the biasing force and removed from the immediate region of the cartridge. When the levers are finally released to make the sensing of notch location or depth, that lever (or in some instances, more than a single lever) which finds a notch is utilized to control the activation of suitably arranged switching equipment to develop electrical output signals indicative of the notch location and any other characteristics for which the operation is adapted. These output signals, then, control the movement path of the sensed cartridge to the proper one of a plurality of different collection points.

Cycling is provided in conjunction with the drive mechanism. A relationship is so established that during non-sensing periods, each of the sensing levers is removed from a cartridge-contacting position thereby to permit the cartridges to be moved to and from the sensing position by the conveyor. At the same time, the cycling mechanism causes the arresting gate mechanism to be removed from the cartridge motional path to permit cartridge movement therebeyond. The cycling operation is then continued by closure of the gate, after which the motion of the next cartridge in the file path is arrested and the sensing operation again proceeds.

A single sensing only is required for each cartridge regardless of the number of notches, their depth, or any other characteristic.

In instances where the cartridges are moved intermittently, the cycling provides for movement and stoppage of the cartridge-conveying belt. With an intermittent type of drive, the arresting gate is unnecessary from the standpoint of arresting cartridge motion but is usually retained in order to accurately determine cartridge position relative to the sensing array. The gate is depressed by the cycling mechanism immediately prior to the restarting of the intermittently moving conveyor. The motional path then provides for cartridge movement during non-sensing periods and a stoppage period during which sensing occurs. For conveyor movement of the continuous nature, the spacing of the cartridges there along is so selected that the cartridges whose movement is not arrested during sensing are able to travel along with the belt during the sensing period a distance corresponding to that which separated the lead cartridge from the next in line. In this way, each cartridge moves along the conveyor and reaches the sensing station at a time corresponding precisely to that time when the lead cartridge has been tested and the sensing gate has opened to permit further movement of the cartridge from the sensing station.

The invention has been illustrated in certain of its preferred forms by the accompanying drawings, which represent largely in schematic form, suitable arrangements for carrying out the aims and objects of sorting and selection. By these drawings.

Referring now to the drawings, FIGS. 1 through 4 provide structure for sorting cartridges or magazines having relatively few notches of substantially like depth and width formed within a selected region or length along an edge of the cartridge component. In this form of the invention, the selection will be made only by establishing the position or location of a single notch, rather than to be based upon a requirement that the retrieved information must also set forth the relative depth of the notch and, in some instances, which of a plurality of notches, either separated or adjacent, are simultaneously identified.

Figure 1:
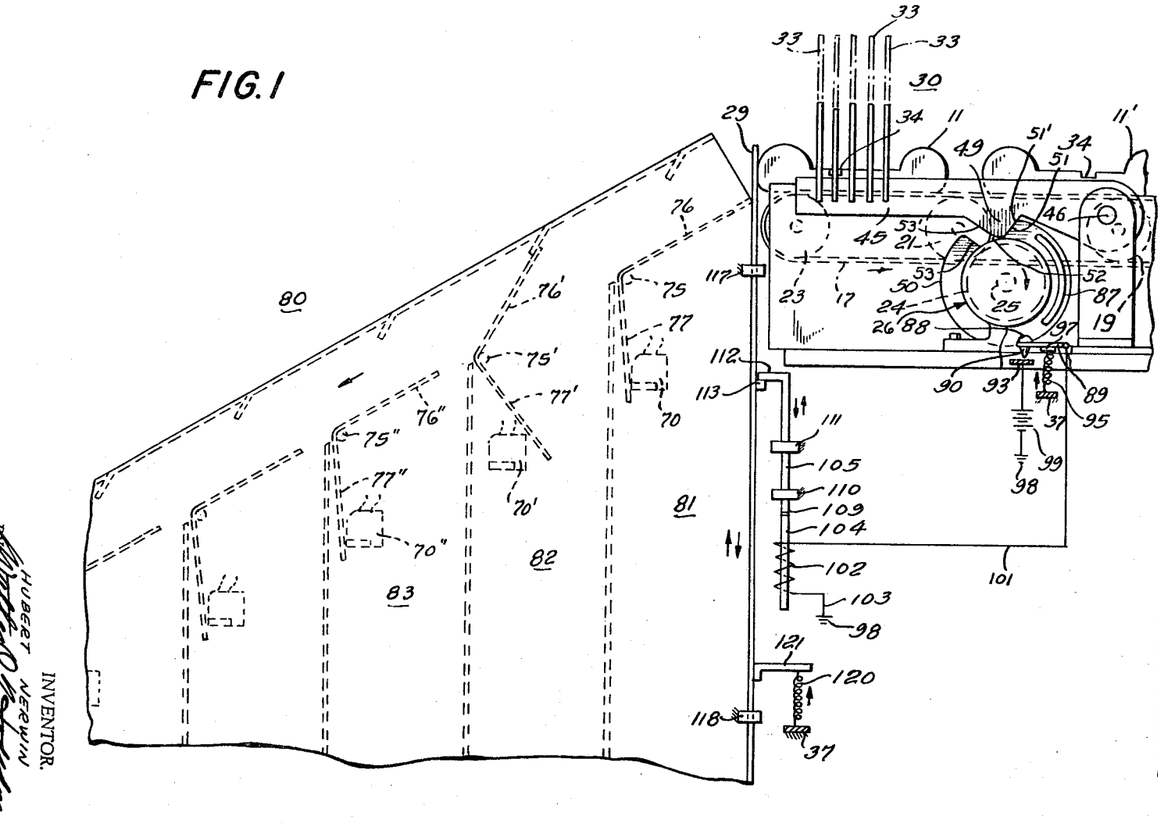
FIG. 1 is a side elevation view of a portion of one form of selection apparatus.

Making reference now first particularly to FIG. 1 of the drawings, a cartridge structure of the general type shown and described in U.S. Letters Patent No. 3,188,084, is illustrated as a type suitable for use in the sorting operation. It is provided with an identification notch or recess located at one of a group of selected positions along one of the cartridge side ribs.

Prior to sorting a series of cartridges of the type illustrated by numeral 11, it will be assumed that the cartridges are supplied from a hopper or bin (not shown) and arranged in similarly oriented positions for travel on a conveyor belt 17. The belt 17 will first be assumed to be driven continuously. As shown, it is driven over a series of rollers 19, 21, and 23, and so on. Each roller is adapted to rotate, in the example shown, in a counterclockwise direction, thereby to move the belt in a direction from right to left as one views the drawings of FIGS. 1 and 2. The driving force may be applied in any selected fashion,. but, in a simplified arrangement, a driving roller 24 which is attached to the shaft 25 of a motor 26 is found quite suitable. In this example, the motor is driven in a clockwise direction with the driving roller 24 establishing surface contact with the roller 21.

Alternatively, the conveyor belt 17 can be driven in any desired fashion through any preferred form of gearing (not shown). The roller contact is one of the simplest drives and, with light loading on the belt, the frictional drive is entirely adequate. In cases where a greater driving force is required, more than a single roller element may provide a driving force, or suitable gearing or belt drive connections may be established in any desired fashion between the rotary motor shaft and the various belt drive components.

The belt 17 is normally moved continuously at a substantially uniform rate. It is moved at a rate such that in the time allotted between moving each component to a sensing position, and then doing the sensing of each component or cartridge, and then moving the next succeeding component to the sensing position, the drive shaft of the arrangement provided will make one revolution. There is thus provided a steady and uniform flow or movement of cartridges to the sensing station.

As was above stated, the forward cartridge in the file arrangement is always stopped (its motion arrested) as the cartridge moves to the gate or sensing location. Because of this arrested motion at the sensing location, the cartridges moving along by the belt in the direction of the arrow are spaced from each other by any appropriate distance, such as that marked as $x$ (see FIG. 2) which separates the trailing edge of the instantaneously most forward cartridge 11 from the leading edge of the next adjacent cartridge 11' on the belt. The separation is just adequate to allow for the sensing and subsequent start of continued advance of the leading cartridge prior to the moment when the next succeeding cartridge arrives at a position adjacent to that on the belt which previously has been occupied by the leading cartridge.

When the cartridges on the belt 17 finally reach the sensing station (generally shown at 30), they are stopped by a gate 29. The gate extends transversely of the conveyor path. The leading cartridge is held at the gate 29 following impact for only a relatively short time period (that required to sense). Nevertheless during this short time period of arrested cartridge motion, it is possible to explore identification notches of the cartridge. The resultant determination of the notch position or characteristic provides information sought regarding the cartridge.

The exploration and identification of each cartridge is achieved by a group of sensing levers which are normally adapted to be held in an elevated position and removed from each cartridge as it moves along by the conveyor but which sense the notch characteristics in the cartridge sensing position. These levers are shown at 33. A sufficient number of them is provided so that one lever is normally available for the exploration of each possible notch location on the cartridge.

The cartridge identification notch is schematically represented at 34. It may be in any position desired along the cartridge between its generally bulbous shape ends, although the notches must be confined within a peripheral distance along the cartridge which is represented by the spacing between the sensing lever 33 most to the left and the sensing lever most to the right of the group. Thus, no matter what the notch location, the arrested cartridge will have one of its notches in the path of one of the lever elements.

Figures 2, 4:
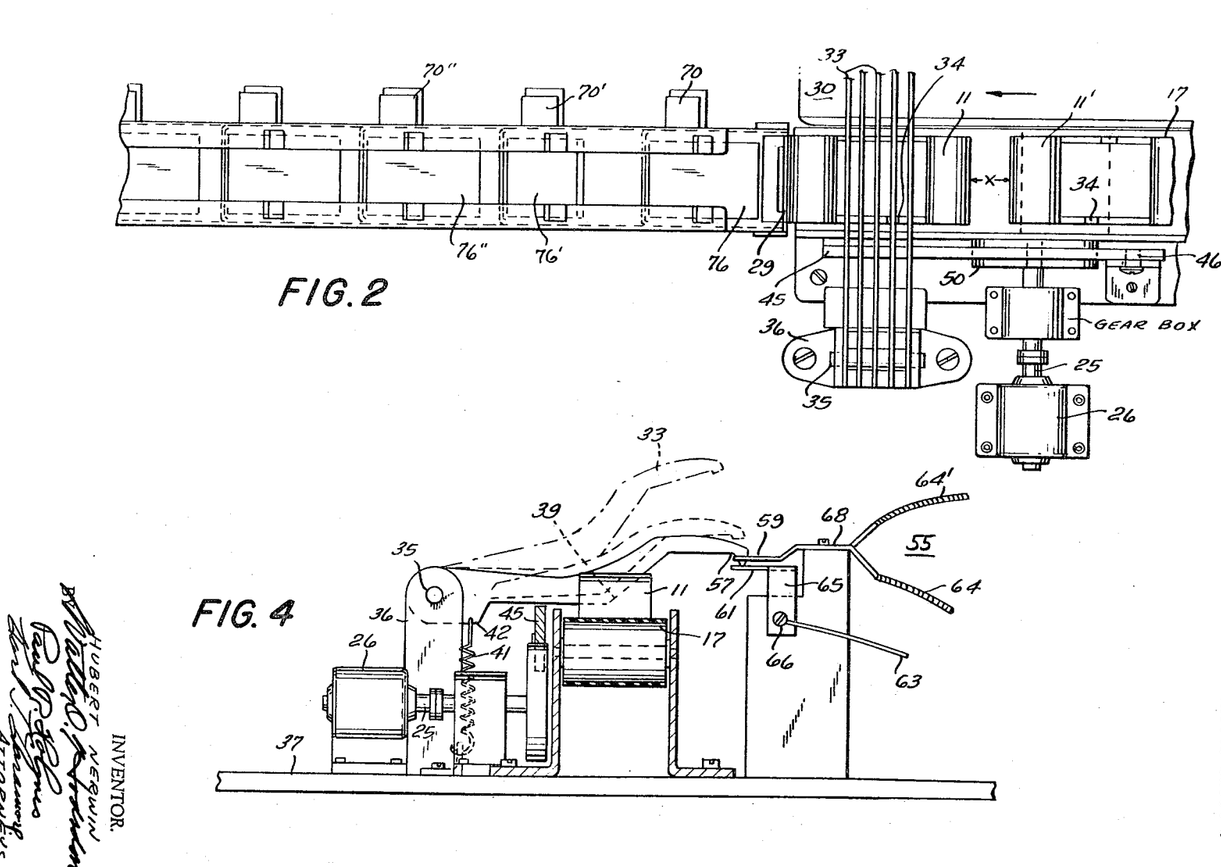
FIG. 2 is a plan view of the selection apparatus of FIG. 1.
FIG. 4 is a sectional view taken substantially on the line 4—4 of FIG. 3 selecting or sensing levers in closing the electrical circuits, with certain levers being shown in phantom to indicate different possible positionings.
Figure 3:
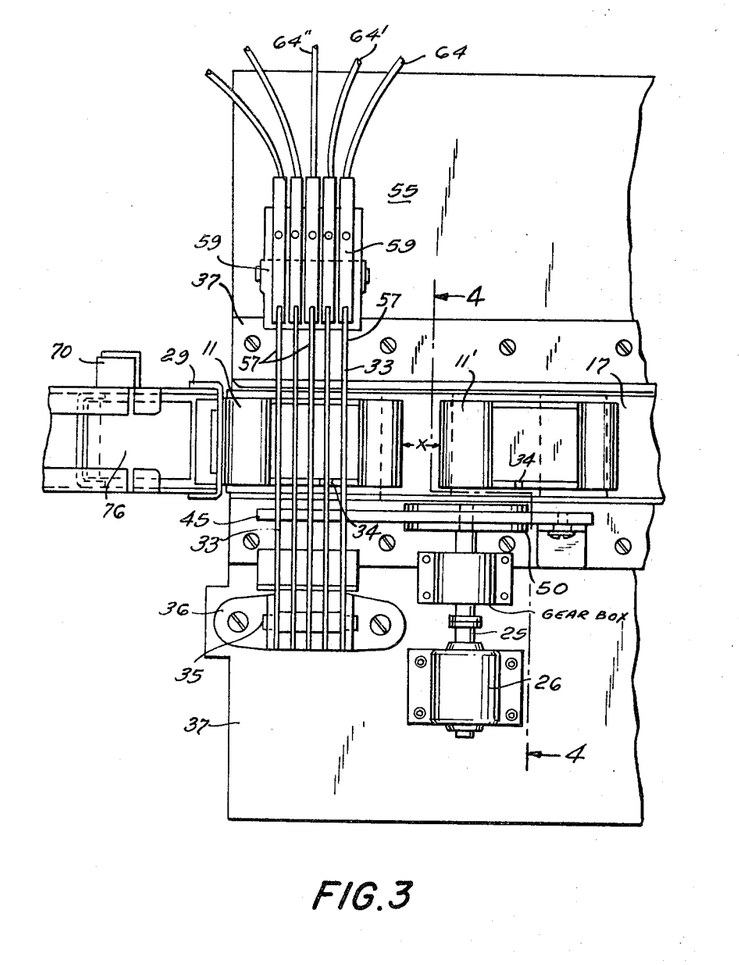
FIG. 3 is a plan view of a portion of the apparatus of FIG. 1 particularly to show the selecting levers and switching contact members.

As can be seen particularly by FIG. 4, each of the group of sensing levers 33 is pivoted upon a support spindle or shaft 35. This support shaft is carried in an upstanding bearing element 36 which extends above a support base element 37. The levers are all positioned and hung from the shaft 35 in such a way as to extend with at least a portion of the lever over and above the cartridges 11, 11', and so on, moving along the conveyor path.

Each of the levers is shaped to provide a downwardly depending portion or lip 39 which is adapted to fall within that notch of the adjacent cartridge which may happen to be beneath the lever as it is permitted to fall. Then one of the levers of the group is lowered to a minor extent below the plane of other levers and sensing and identification of the cartridge is achieved as will later be discussed.

The levers normally have a biasing force applied thereon which tends to rotate the loosely mounted levers (in the position diagrammed) to move into engagement with that portion of the cartridge having the notches and whereupon at least one of them will drop into the notch in the cartridge which identifies the type of film it contains. By the illustrated biasing means, the inner end 42 of each lever has an eye into which one end of a spring member 41 is attached. The other end of each spring is anchored to the base 37 in any desired fashion. The levers are held in an inoperative position out of contact with the cartridge at the sensing station during all time periods except that used for sensing by means of a control lever arm 45 that is loosely carried upon a shaft 46 (see FIGS. 1 and 2).

The lever arm 45 extends in a direction parallel to the conveyor 17 and is generally adjacent thereto. The arm extends from its support point on the shaft 46 to a position with its outer end substantially adjacent to the gate 29. The attachment is such that the arm is positioned immediately below each of the levers. If the arm hung freely and not subject to rotation, it would normally tend to move in the position shown to rotate counterclockwise (under the effect of gravity) and always be free of levers 33. Under the circumstances, the lever 45 is used to raise each of the sensing levers 33 above the plane of any cartridge on the conveyor for all times except that allotted to the sensing operation. For this purpose, an upwardly acting force is exerted on the lever 45 at all, except sensing, periods to hold it against the lower surface of the sensing levers 33. The lever 45 has a downwardly depending lip or cam follower section 49 near its pivoted end. The forward edge of this lip has a rather gradually downwardly turned section 53' which terminates in substantially a tooth-like section which then turns sharply upward at 51' toward the inner end of the lever where it is pivoted.

The lever normally is positioned so that its downwardly depending lip or cam follower section 49 rides on the outer periphery of a cam 50. The cam 50 is arranged to be driven by the driving motor 26, either directly or through an appropriate gear box (not shown). Cam 50 is formed so that the major portion of its periphery is substantially circular. There is, however, a notch section 52 formed therein for a limited peripheral section. The notch has forward and rear surfaces 51 and 53 substantially corresponding in shape to the downwardly depending sections of the tooth or follower section 49 on the lever 45. The bottom portion of the notch, however, spreads out to provide substantially a circular periphery for a limited peripheral or arcuate section. This latter circular section is of a lesser diameter than the major portion of the cam. This diameter reduction is sufficient to permit the depending lip 49 to drop downwardly and so remain for that selected part of the cam periphery.

As already assumed, the lever 45 is normally raised by the cam 50 raising the lower edge of the tooth or follower section 49 which is arranged to follow its outer edge. The cam 50 may be assumed to rotate clockwise as does motor 26. This rotation permits the tooth or follower section 49 to drop downwardly as the tooth edge 51' reaches the sharply inwardly turned edge 51. The lever arm 45 then turns counterclockwise about its support point 46, with such movement being both by the effect of gravity on the lever and the effective force of the spring elements 41 acting on the lever arms 33, which elements had been forced upwardly by the upper surface of lever 45 prior to engagement between tooth 49 and the notch 51. With downward movement of the lever 45, the already described sensing operation achieved by the levers 33 is commenced immediately and continues so long as the downwardly depending portion of the lip or cam follower 49 remains in the recessed portion 51 of the cam 50. With further rotation of the cam to bring the gradually sloping follower edge 53 of the recess against edge 53' of the downwardly depending lip or cam follower section 49, the lever 45 is gradually raised. Immediately the sensing levers 33 are all removed from a position in contact with the cartridge. During the sensing operation, one or more of the levers 33, depending upon the type of operation, had entered into one of the notches 34 in the cartridge 11 as already described, to provide the identification control signal, with the timing being measured by the peripheral extent of the recessed portion along the periphery of cam 50.

During continued motion of the conveyor belt 17, and the arresting of motion of the leading cartridge as it reaches the gate 29, the next succeeding cartridge in the file moves a distance to bring it substantially adjacent to the leading cartridge by the time the cam 50 is rotated a distance sufficiently far to change the position of the depending lip 49 on the lever 45 from a position corresponding to the outer peripheral location on the cam 50 down through the notch 51 and back to the outer peripheral location. By this time the cartridge next following that under test will be prepared to move into the sensing position immediately upon removal of the leading cartridge from the sensing position at the instant the gate 29 is depressed, as will later be explained. With the lower or depressing of the gate 29, the lead cartridge is once more immediately subjected to the driving effect of the belt or conveyor 17 thereby to move it away from the sensing station at the same rate that the next cartridge moves into the sensing station.

From the foregoing, it is apparent that the opening and closing of the gate 29 must be coordinated both with the movement of the lever 45 and the turning of the cam 50. This relationship will be set forth at a later point in this discussion. At this moment, consideration may be given to the effects achieved when one of the levers 33 is dropped into a notch 34 in the cartridge in sensing position, e.g., cartridge 11 in FIGS. 1–4. To register the effect, a group of normally open switch elements equal in number to lever elements 33 and generally represented by the numeral 55, is located in side-by-side relation adjacent to the conveyor and opposite the mounting position of the lever elements 33. The forward end 57 of each lever is turned downwardly and is adapted, when moved to its lowermost position, to rest against a small flexible contact plate 59 and to close it upon a lower contact plate 61. This closure establishes an electrical circuit through the common ground conductor 63 and an energized conductor line 64. All of the lower contact plates 61 are connected to a common conducting strip 65 and connection is established to this plate at 66 by the common conductor line. The upper contacts 59 are all supported upon an upstanding member 68 and held in insulated relationship with respect to each other. Separate conductors 64, 64', 64", and so on, lead to each of these contact strips or members 59 so that with any one of the levers 33 being permitted to drop into one of the notches 34 on the cartridge or magazine, a circuit is closed immediately between one of the contact members 59 and the common connection in the form of the conducting strip 65. Any closure of the circuit between any one of the contacts 64, 64', 64", and so on, provides a connection which is adapted to energize one of the relay elements 70, 70', 70", and so on, thereby to open one of the gate elements 76, 76', 76", and so on, in the cartridge discharge path.

The gate elements are arranged to pivot about shaft members 75, 75', 75", and so on. They are formed generally as two-sided components joined at approximately the shaft position and angularly spaced from each other by slightly more than 90° to form an obtuse angle. These side member, illustrated particularly in FIG. 1 of the drawing at 76, 77, or 76', 77', 76", 77", and so on, are so formed as to either open or close passageways along a slide path, generally designated 80, into storage bin areas 81, 82, 83, and so on. With the gate elements formed from the sides 76 and 77 being in the closed position, cartridges after moving off the belt 17 when the gate 29 is depressed (as will later be explained) pass downwardly over the slide path over all gates which are closed but with the gate being open, are directed into one of the storage bins.

Illustratively, in the position shown, a cartridge leaving the belt 17 will pass over the slide path 80 and the upper surface of the side member 76, which then forms a part of the slide path. If, at the particular instant, let it be assumed that a contact was closed to element 65 by one of the switches to energize relay 70', the gate section comprising the side members 76' and 77' is opened. In this event, the cartridge which has been discharged from the belt to the slide path 80 moves down the slide path and over the upper surface of the slide member 76 but upon coming into the region which would be closed by the side member 76' in the absence of relay energization, the cartridge finds that there has been an opening of the upper entry into the storage bin 82 and at this time, the cartridge drops by gravity into the storage bin section 82. As the cartridge drops into the bin, it hits against the upper surface of the side member 77' and immediately closes the gate section, thereby to move both the side members 76' and 77' back to the original position. This position corresponds to that shown for side member 76 and 77. If now the selection of the notches in the cartridges had been such that another relay, such as 70", had been energized, the cartridge, after discharge, would slide down the slide path 80 until it came to the region of the bin 83, at which time the gate would be open, and the conditions above explained would then occur except that the cartridge hitting the side of the side member 77" would then cause gate 76", 77" to close.

The gate structure 29 against which the cartridge 11 is moved for sensing purposes in order to obtain cartridge identification from the position of the notch 34 relative to the sensing levers arrests the motion of the cartridge until the sensing has been completed. The sensing, as already explained, is completed when the rotary cam 50 turns sufficiently that the depending lip 49 of the lever 45 which is rested in the notch 51, reaches the rear face 53 of the notch. As this occurs, the lever 45 is raised and, with this, all of the sensing levers are raised above the cartridge to remove them from any notch therebeneath. All of the electrical circuits are maintained by any well-known form of delay elements such as the usual bi-metallic strip form of component and the relays hold their position for a selected time period. Immediately following the positioning of the dependent lip 49 of the cam follower upon the outer periphery of the cam 50, a rib section 87 extending outwardly from the cam 50 (or which is formed as a separate cam adjacent to the cam 50 and also carried upon the shaft 25) is adapted to make contact with an insulating contact segment 88 carried upon the armature 89. The armature 89 is a conducting strip having a contact point 90 at its outer end. Contact between the point 90 and a second contact point 93 is established with the rotation of the rib surface 87 closing over the insulated segment 88 thereby forcing the armature 89 downwardly against an upward force exerted by a spring 95 thereupon. The spring is secured to any part of the frame or base 37 and bears upon an insulating strip 97 positioned on the lower surface of the armature 89 thereby to insulate the armature from the frame proper. A closure of the contact points 90 and 93 then completes an electrical circuit from a ground point 98 through the conventionally represented source 99 (schematically shown as a battery), the contact points, the armature 89, the conductor 101, the winding 102 of a relay element and thence, through conductor 103 back to ground 98. A relay core 104 extends within the relay winding 102. An upper section 105, which is mechanically connected to core 104 but magnetically insulated by an insulator 109, serves as an extension of the core 104. The core 104 and upper section 105 are supported positionally within bearing or guide elements 110 and 111, carried in the frame 37, thereby to guide each of the relay core 104 and its upper section 105 in a selected up-and-down path.

The upper end of the section 105 is bent into L-formation at 112 and is adapted to rest above a stop member 113 formed on the inner side of the lower section of the gate 29, and, therefore, adapted to move up and down with the gate. The gate 29 is held in bearing members 117 and 118 so as to be securely positioned and laterally located so that the gate may be moved up and down, as shown by the direction of the arrows, under the influence of either a spring member 120 for upward movement or by energization of the relay winding 102 for downward motion. The spring 120 is attached at one end to a bracket 121 which is fastened to the lower end of the extension of the gate 29. The spring is adapted normally to force the gate 29 in an upward position thereby to close it across the path leading from the conveyor belt 17 thereby to preclude any cartridge on the conveyor from moving beyond the plane of the gate as long as the gate is in its upward position (as shown). However, closure of the contacts 90 and 93 establishes a flow of current through the relay winding 102 and serves to draw the relay core in a downwardly extending direction. With the core, the upper section 105 is also pulled downwardly. This action, together with the outer end of the L-shaped portion 112 pulling against the stop member 113, causes the gate to be drawn downwardly against the force of the spring 120 during the period when the rib section 87 is permitted to force the insulator contact downwardly to establish circuit closure.

The positioning of the rib section 87 on the cam 50 is so set relative to the notch 51 and its rear surface 53 that the lever 45 is adapted to raise all of the sensing levers 33 away from the cartridge prior to the time of gate opening. However, the rib section 87 terminates sufficiently soon that the contacts 93 open under the force of the spring 95 to close the gate (de-energizing the relay winding 102 and permitting the spring 120 to force closure) prior to the time the next succeeding cartridge on the conveyor arrives at the sensing station.

This operation repeats continually with the gate being opened or depressed to permit the removal of the cartridge from the conveyor but to be closed or moved upwardly to arrest movement of a cartridge on the conveyor for a time period sufficient to permit sensing. The circuit operations, the relay and the gate are independent of the circuiting operations caused by the closing of the contacts operated by the sensing levers 33 although the timing of circuit operation is coordinated. With the selection having been made, the cartridges move one after another to one or another of the selecting bins 81, 82, 83, and so on, and sensing testing or exploration of the cartridges for the identifying notch characteristics at 34 proceed.

Figure 5:
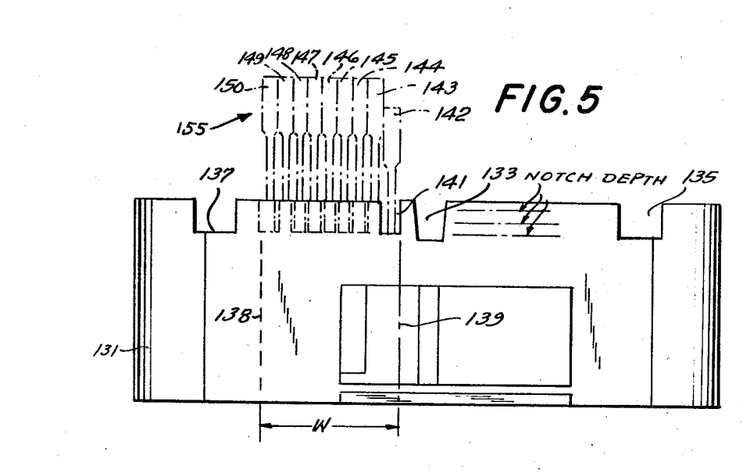
FIG. 5 shows a film holding cartridge of the type having notches whose depth as well as location of the cartridge identifies the film type in association with a group of film type-selecting levers, the levers being shown therewith in phantom array, and it being understood that the remaining three sides of the cartridge are generally plain and normally unnotched.

In FIGS. 5 through 11 of the drawings, another embodiment of the present invention is shown and which is particularly adapted to identify and sort film cartridges having code notches which differ in depth as well as location so that the range of types is greatly expanded. In FIG. 5 a well-known Super 8 movie film cartridge having the designation 131 is depicted in elevation, looking at one side member notch provided with identifying notches in the top edge. The cartridge is usually essentially rectangular or square in shape, see FIG. 7. It is provided with top and bottom portions, as well as three remaining side members, all of which are tightly molded or otherwise secured together. The cartridge 131 is usually molded from a suitable plastic material, and the sides, top and bottom of which are appropriately pressed together to make and maintain the interior lightproof. A film strip (not shown) is supported and positioned within the cartridge for unwinding from a coil (not shown) within the storage chamber and for winding on a take-up core following exposure. The film-holding cartridge (see FIG. 5) is provided substantially at its center with a locating notch 133 which cooperates with a pin in the camera (not shown) to prevent the cartridge from being placed incorrectly in the camera. Two additional notches are at either edge. The notch 135, for ready identification, may be assumed to designate the film-speed notch. The notch 137 is commonly identified as the filter notch. It is normally used to identify particular types of film and usually whether or not the film functions best under daylight exposure or artificial exposure.

In the peripheral edge region between the indicated left-hand limit 138 and the indicated right-hand limit 139 and designated by the width W a notch may be formed in the cartridge case in any one of the several possible $m$ locations within the space between the limits 138 and 139, and which notches may be cut to any one of the $n$ selected depths.

One of these notches is shown at 141. This notch, in ordinary operations, may be cut to any one of the $n$ different selected depths such as, any one of three assumed notch depths (see dot-dash depth lines) thereby to provide and extend the identification already mentioned. The particular group of sensing levers 142 through 150, inclusive, for sensing the location and depth of the slots are shown in phantom by FIG. 5. According to one preferred form, the cartridge casing area immediately behind each of the notch locations is recessed as shown at R in FIGS. 7 and 8 so that the levers (identified as a group by numeral 155) may freely drop down into the notches and even extend slightly inwardly of the film casing edge.

The film cartridge may be made in various sizes. However, illustratively, it has been found from practical aspects that a cartridge about 2½ inches per side with the spacing between the top and bottom closure members being approximately one inch is quite satisfactory. The space allocation within which the assumed number of notches may be positioned, of course, may vary within wide ranges, but as an illustrative space allocation, a limitation to about ¾-inch distance is satisfactory. A film cartridge of the type mentioned is similar to that disclosed in U.S. Patent 3,208,686 except that the patented cartridge does not show the coding notches along one edge thereof.

Figure 6:
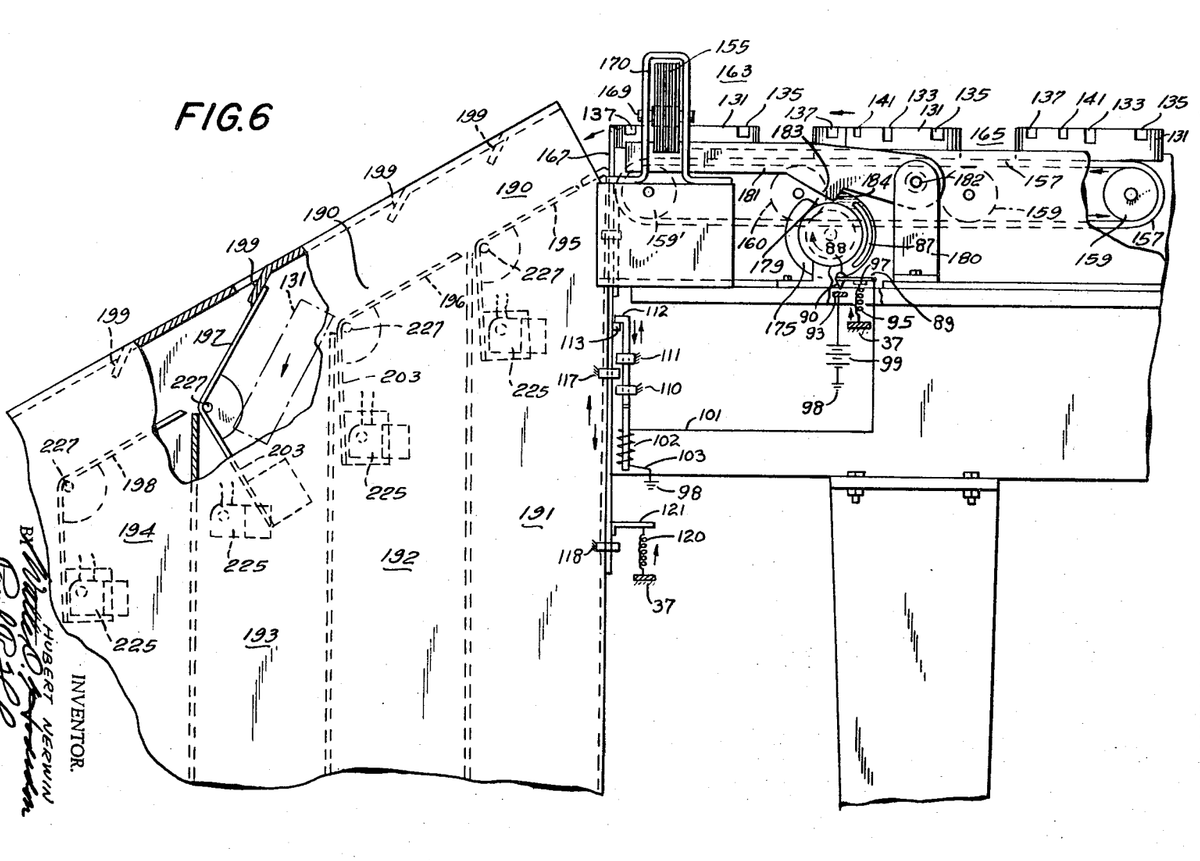
FIG. 6 is a side elevational view of a modified cartridge-selecting mechanism adapted particularly for the identification of film-holding cartridges of the type depicted by FIG. 5 and for the sorting of the cartridge, following identification, to particular collection bins for processing.
Figure 7:
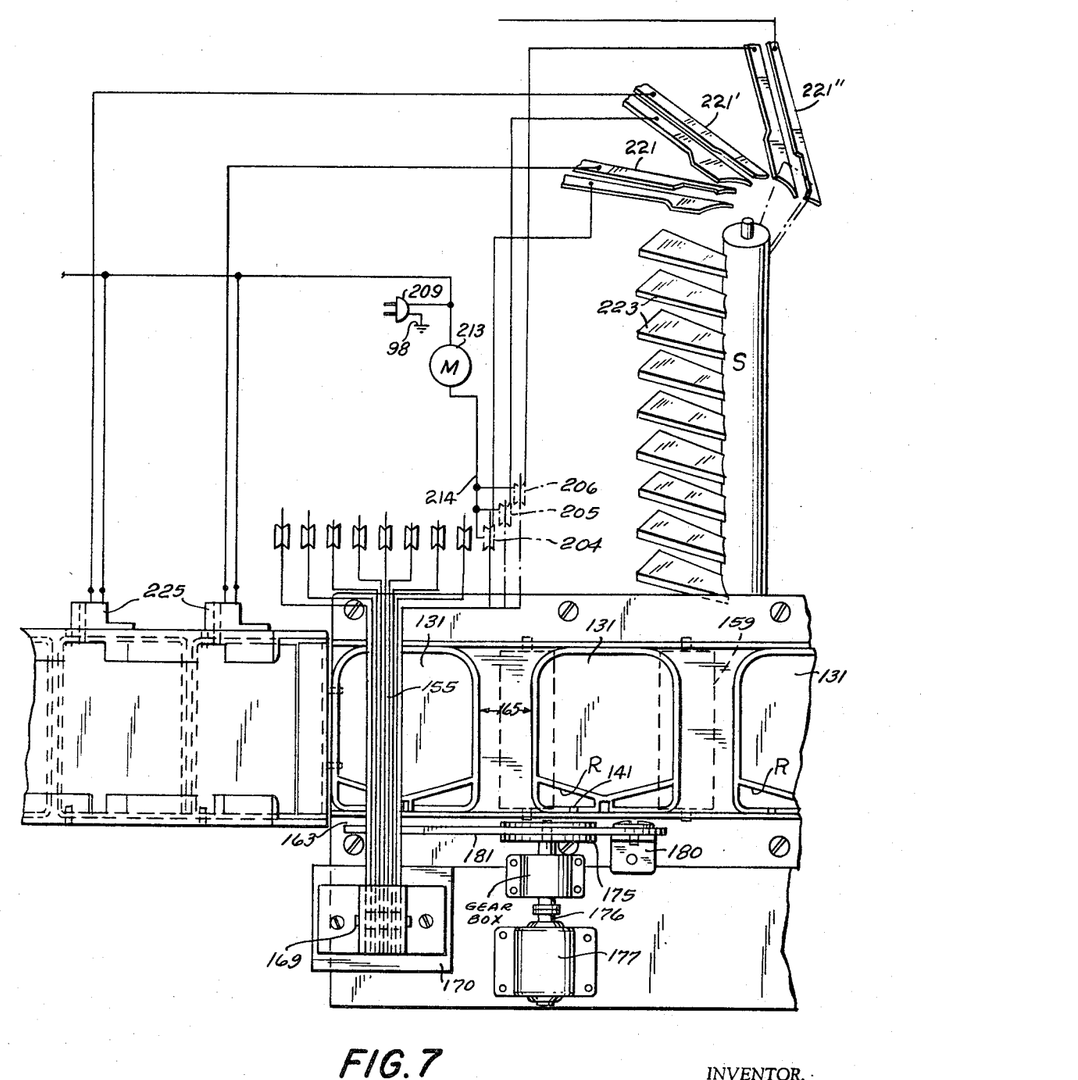
FIG. 7 is a schematic plan view of the sensing apparatus shown in elevation by FIG. 6, with FIG. 7 showing in particular and in expanded form a pattern of switch selecting devices energized by the sensing mechanism; with the switch components turned approximately 90° from normal position to relate them better to the sensing mechanism.

The various forms of cartridge 131 dispensed from any hopper or magazine (not shown) are normally fed onto a conveyor belt 157 (see FIG. 6) which is wrapped over a plurality of rollers 159 with driving force applied from rollers 160. Each roller turns at like speed to convey any articles upon the belt to a sensing station position, generally indicated at 163. The belt turns over a final roller 159' as it passes the sensing station. It is usually preferable in supplying the cartridge elements to the conveyor belt 157 to space them apart, as is generally indicated in the showings of FIGS. 6 and 7 by the designation 165.

The cartridges when moving along with the conveyor belt may be considered to move in a unit time period through a distance corresponding to the peripheral length of the edge to be explored and that distance, such as 165, which separates adjacent cartridges. This travel distance may be considered to be a distance $x$.

The individual cartridges, when finally conveyed into the sensing station 163, are momentarily arrested in their forward movement by a holding gate 167 (similar to gate 29 of FIG. 1). This is the sensing position where the forward motional path of the leading cartridge is stopped and the conveyor belt then slides beneath the first (the stopped) cartridge in the file. The other cartridges in the file path continue to move along at the belt speed.

The articles which continue to move along with the belt while the sensing operation occurs on the leading cartridge move a distance approximately equal to the separation distance 165. This is usually just slightly less than half the distance $x$, as above explained, and, for convenience of reference, may be considered as $y$. This establishes the length of the cartridge side (for reference) as $(x-y)$.

Following sensing of the cartridge held by gate 167, the gate is withdrawn to permit continued motion of the forward cartridge off the end of the belt. The gate is then returned promptly to its cartridge-arrest position prior to the arrival of the next succeeding cartridge 131 being moved by the belt to the sensing position.

At the sensing station 163, sensing levers 155 of a number corresponding to the selected number of possible notch positions are pivotally mounted in loose fashion on a suitable bearing shaft 169 carried upon the frame 170. As shown particularly by FIGS. 8 and 10 these levers each have a downwardly extending rib 171 adapted to fit within the width of any one of the film type selecting notches 141. As the moving conveyor belt 157 carries the cartridges along finally to reach the sensing position 163 at which the cartridge abuts the stop and release gate 167, the motion is coordinated with the rotational speed of the driven rotary cam and switch control element 175 (see FIGS. 6 and 7) adapted to rotate, as indicated, in a clockwise direction. The cam and switch control element 175 is supported in the framework in any desired fashion and rotates at such a speed and is of such size that its peripheral or circumferential measurement is proportioned to the spacing between the forward edge of any two successive cartridges upon the conveyor belt. The cam and switch control element makes one rotation during the time period the cartridge conveyor belt moves through a distance corresponding to that separating the leading edge of any two adjacent moving cartridges. The cam is supported usually on the shaft 176 of motor 177 to be driven in any desired fashion.

The cam element 175 is of a general contour substantially like cam 50 of FIG. 1. Thus, the major part is essentially circular with a generally V-shaped notch 179 cut in one peripheral portion thereof. A support 180 on the framework locates the cam and switch control element. It carries also a suitable lever arm 181 loosely, pivotally supported at 182. The lever arm 181 has a downwardly extending tooth-like cam follower section 183 whose rear edge extends outwardly for at least the depth of the cam notch 184. The forward side of the follower section has a sharp edge (like the cam) so that as the cam rotates beyond its notched portion the follower section promptly drops into the notch. As the cam continues to rotate the depending section 183 finally contacts the cam rim and raises the lever 181 to a position to prevent any of the lever arms 155 from extending into the notches 141 until the lever arms are again lowered. At the time the pointed edge of the follower 183 contacts the cam rim in the notch position, while the cartridge is in an arrest-motion position, any one of the lever arms 142 to 150 may fall into one of the recesses 141, which might be aligned therewith, as can be seen by FIG. 5. When the lever arm 181 is raised it holds the sensing levers away from the recess and above the topmost plane of any of the cartridges so that the cartridge in sensing position can move freely along with the conveyor.

As the cam 175 continues to rotate and the notch portion 184 moves opposite the follower section 183 at the time the cartridge reaches its most advanced position in the line of motion the cartridge sensing position is reached. It is at this time period that the lever arms 142 to 150 drop downwardly and all of the levers fall either gravitationally or by the force exerted by spring-fingers 185 (see FIGS. 8 and 10), to rest upon the peripheral region of the cartridge, as indicated between designations 138 and 139 in FIG. 5. That one or ones of the group of lever arms 142 through 150 which is instantaneously opposite one of the notches 141 will fall downwardly below the cartridge rim and enter the notch at that particular location.

Figure 8:
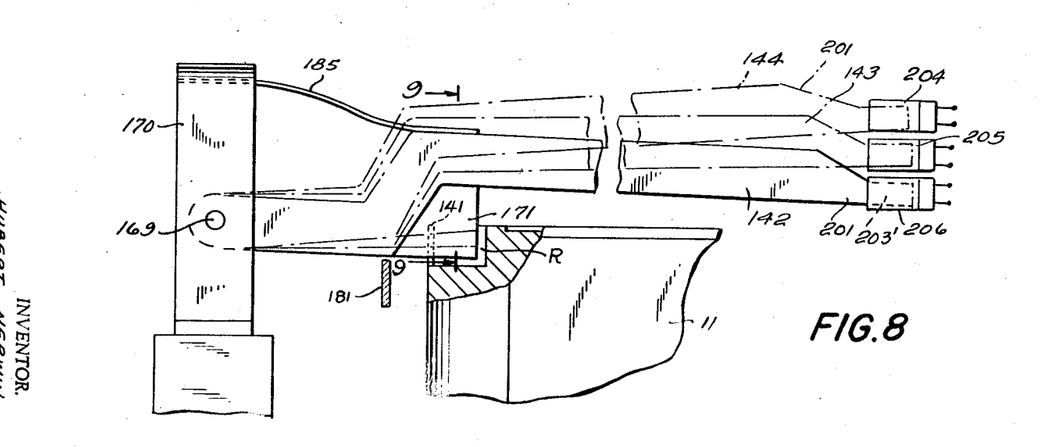
FIG. 8 is a substantially enlarged cross-section of an edge portion of the film-holding cartridge of the type shown in FIGS. 5–7 with sensing lever shown in elevation in association therewith for identifying the cartridge achieved by way of notch location and notch depth.
Figures 9, 10:
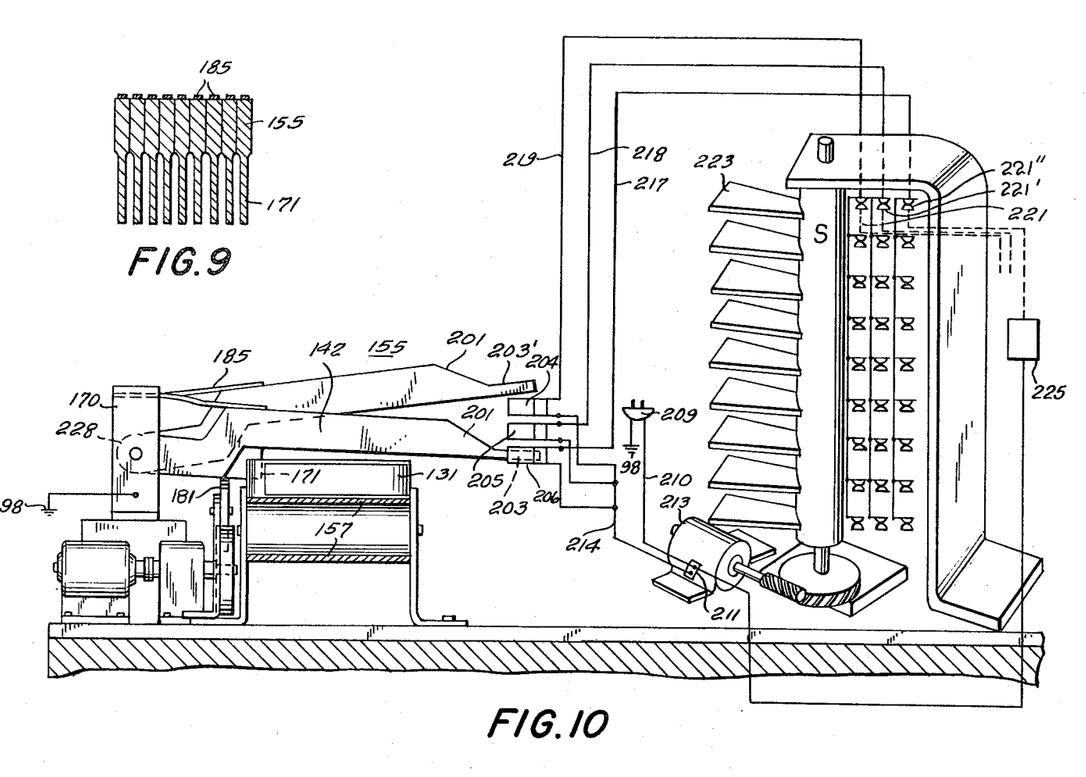
FIG. 9 is a sectional view taken substantially on the line 9—9 of FIG. 8, but omitting the cartridge and showing all of the sensing levers in the positions they will assume prior to sensing a notch in a cartridge, whereas in FIG. 5 one of the sensing levers has been shown sensing a notch in a cartridge.
FIG. 10 is an elevational view particularly to portray one form of sensing mechanism by which film cartridge may be achieved when the notch depth as well as the notch location determines the film type and the coordinated micro- and rotary-switch elements associated therewith.
Figure 11:
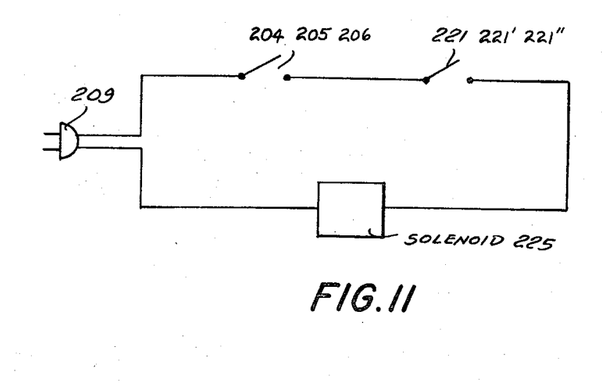
FIG. 11 is a schematic electrical diagram emphasizing the required coordination between the rotary and micro-switches of FIGS. 7 and 10 to achieve proper sorting of the sensed cartridge.

The showing of FIGS. 5 and 10 in particular depicts the manner by which one of the lever arms drops into position. That one of the lever arms which is located above one of the notches 141 at the moment falls into the notch and sets up a control signal thereby to control the final selection and sorting of the distributed cartridges. It is suffice to say in connection with the discussion of FIG. 8, that in the position in which the lever arm 181 is shown, one of the lever arms 142 to 150 is adapted to drop into one of the notches (as in FIG. 5) of the most forward cartridge (that one of which forward motion is instantly arrested).

As the cam 175 turns further and raises the arm 181 all of the lever arms, as above stated, are removed from the sensing position. Sensing is then completed for one cartridge.

It was above mentioned that the forward motion of the different cartridges is arrested by the stop gate 167 located at the forward end of the conveyor. The gate is normally spring pressed upwardly to a position crossing the forward path of the moving cartridge, as shown by FIGS. 1 and 6. At a time immediately following the cartridge sensing and immediately following the raising of the lever arms from cartridge-contact position, as produced by the upward movement of the lever arm 181, the stopping gate 167 is withdrawn. This operation may be brought about in various ways but one suitable method is shown by FIGS. 1 and 6 and, illustratively, may here be assumed to be duplicated.

Immediately adjacent to the stop gate 167 the path along which a moved cartridge can travel changes from that generally shown as horizontal, as provided by the belt conveyor 157, to a slide or slope path, schematically designated as 190, along which the cartridges slide under gravitational influence. The cartridges, as soon as they move beyond the plane of the stop gate 167 (at times when the said gate element is in its retracted position), fall by gravity from the conveyor belt and come to rest upon the slide 190. They then move along the slide path from which they can selectively enter one of the article receiving bins 191 through 194, for instance. While only four article receiving bins are illustrated, it will be appreciated that there will usually be the same number of bins as there are different types of film cartridges. The final path selection is determined by the one of lever arms 142 through 150 which enters one of code notches 141 aligned therewith as will be further set forth. The slide path 190 is composed of a substantial number of adjacently positioned trap door elements 195 through 198 pivoted on a hinge element 227 carried from a wall of each cartridge storing bin.

The trap doors 195, 196 (and others) when closed (as indicated, illustratively, by the two most nearly adjacent to the stop gate 167) form substantially a continuous path along which the cartridges may slide. When any door is opened, as shown in FIG. 6 by the third door to the left of the stop gate 167, the continuance of the smooth slide path 190 is broken. The inside surface of the door 197 then is contacted by the sliding cartridge. The cartridge 131 element is then directed into one of the bins, such as 193. The upper door surface, on opening, comes to rest against the stop 199 formed in the slide path, thereby to limit the amount of rotation. As the cartridges slide and finally reach one of the open doors, which location has been determined by the sensing, it soon touches a lower flap section, such as 203, of the trap door. This contact with a closely balanced door element makes it possible immediately to reset the pivoted element to its initial position.

The opening of each of the trap doors is determined by the state of energization or deenergization of a relay element 225 which, when energized, draws the lower-section component outwardly thereby to provide counter-clockwise rotation of the trap door section as provided by the pivoted door elements, such as 197 in the showing of FIG. 6.

The foregoing explains the control established to open any one of the trap door sections. The closure of each of these doors, following allocations of the selected cartridge to one of the bins 191 through 194, and so on, reestablishes the original slope discharge slide path 190.

Making reference now particularly to the showing of FIGS. 7 and 8, consideration may be given to the apparatus to achieve the control of the various selections. As one of the sensing levers 155 is permitted to fall individually into one or another of the slots 141 of the cartridge, that lever finally assumes a position where its depending rib 171 drops to the bottom of the engaged notch. It was above pointed out (and assumed for illustrative purposes) that the notches, in the assumed example, may extend to any of three different depths and be positioned at any of a plurality of points within a selected range, or peripheral edge location on the cartridge, as indicated between 138 and 139 identified by the designation "W" in FIG. 5. In FIG. 8, the lever arm 142 is shown in its solid outline form in such position relative to its pivot point 169 that the depending rib 171 extends to the maximum notch depth. The other two positions (as in dotted outline) for the levers 143 and 144 (other lever arms 145 to 150 not shown by this figure) depict the other two depths of the notches 141 might possess.

Each of the m lever arms (nine illustrated as one example) is provided at its forward end 201 with a conducting segment 203' adapted, when the lever arm drops into a notch 141 on the cartridge, to come to rest between the contact elements of one of n (three in the described example) normally open micro-switch elements 204, 205 and 206 and thereby close an electrical circuit therethrough. The switch elements 204, 205 and 206 are associated with each lever arm because the notches 141 may be of three different depths. As clearly illustrated in FIGS. 8 and 10 these three switch elements are spaced from one another in the arcuate path of movement. The contact end 203' of the lever arms might move so that they will be closed in succession as the lever arm drops into notches of different depths. In other words, the particular one of switch elements 204, 205 or 206 which is closed by lever arm 142 is determined by the depth of the notch 141 which the lever arm drops into during the sensing operation. In FIG. 10 the contact end 203' of the lever arm 142 is shown closing switch element 206 because the depending rib 171 is engaging with notch 141 in its deepest possible position.

While the circuit may be set up in any desired fashion, as illustratively shown in FIG. 7, electric plug 209 is adapted to connect with an AC power supply and have one terminal thereof grounded at 98. Current then may flow through the plug 209, conductor 210 and the conducting segment 211 to a motor 213. The current path is then through conductor 214 to one terminal of each of the microswitch elements 204, 205, and 206. Depending upon which of the assumed three possible notch depths the sensing lever 142 engages one or the other of the conductors 217, 218 and 219 is energized from the AC source (not shown). This also determines which of three normally open microswitch elements 221, 221', or 221" will be connected to ground when they are closed by one of the nine connector plates 223 which are spaced along a shaft S rotated by a drive mechanism from the motor 213. As shown there are nine sets of three normally open switches 221, 221', and 221", one set for each of the sensing levers 142–150, and each switch 221, 221', and 221" of each set corresponds to one of the three different depths of notches each sensing lever may encounter. As illustrated in FIGS. 7 the switches 221, 221' and 221" of each set of three are arcuately spaced from one another so that as the connector plates 223 rotate they will close these switches in succession. The switch elements 204, 205, and 206 are closed in timed sequence as one of the sensing levers drops into a notch 141, as becomes evident from FIG. 10, and the successive ones of these switches are closed at least one stop ahead of the closing of any of the corresponding switches 221, 221', and 221". Each of the twenty-seven switch elements 221, 221', and 221" is connected to a solenoid 225 opening the trap door 195–198, etc., to a different storage bin 191–194, etc., so that the sorting operation for a given cartridge is determined by which of the nine sensing lever arms 142–150 engages a notch 141 (this selects one of the three sets of switches 221, 221', and 221") and what the depth of the notch 141 is. This determines which of switches 221, 221' or 221" of each set of three will transmit the signal pulse to the trap door of the proper storage bin.

This form of switch mechanism is then able to establish a control of the operation of the selected one of the solenoids or relay elements 225, as shown in FIG. 7. Then, depending upon which of the m microswitch elements 204, 205 or 206 is activated, and which one of the microswitch elements 221, 221' and 221" is activated by a selector plate 223 will determine which one of the m and n relay elements 225 will activate the particular trap door section 195, 196, 197 and so on. According to the showing of FIGS. 7 and 10, if the control be established through the first switch 204, it is clear that the relay or solenoid 225 furthest to the right of the indicated group will first be energized. This, then, energizes the gate in such a way that the trap door section 195 rotates in a counterclockwise direction about the hinge pivot 227 thereby to move the door against the stop 199 and leave open the entrance into the section 191. If, on the other hand, the established control had been such that the third switch was closed, for instance, switch 206 (FIGS. 7 and 10), the first trap door section to open and come to rest against the stop would be the third from the right of the group indicated. This would provide for the cartridge elements being fed down the incline as reached from the opening of the gate 167 until the cartridge met the first selection mechanism for which for the illustrated example, the cartridge had fallen to the bin 193.

From what is above stated, it follows that the selection may be to any one of a group of components and that these components when selectively activated will provide the desired sorting arrangements.

When the sensing arms 155 are positioned adjacent to the surface to be explored by reason of the lowering of the lever arm 181, provision should be made for forcing each arm section 171 inwardly of the cartridge being explored. The inward motion is established by virture of the spring fingers 185 shown particularly by FIG. 10. The sensing arms 155 and spring fingers 185 are also represented in FIG. 9 but in lesser detail. It is suffice to say, therefore, that the sensing arms 155 have their outer ends freely supported and their inner ends held into the frame member 170. The selecting components comprise a group of lever arms which are held, as above stated, from the frame 170.

FIG. 10 shows the lever element arranged in such a position that the rear end section 228 is so held that the forward section is pressed downwardly by the spring fingers 185 resting on top of the lever arms 155. This is also evident in FIGS. 8 and 9. The force exerted by the forward spring pressed element 185 is sufficient at all times to press the lever arms 155 downwardly so that any lever arm instantaneously positioned above a notch in the cartridge on the conveyor belt will be pressed downwardly to the proper depth into the notch of the cartridge. The lever arm 181 then serves to remove the spring pressed arms from the cartridge following the sensing and gate release to advance the cartridge to the position at which it moves onto the bin selecting section.

The gate control by which the cartridge motion is arrested for sensing and afterward released may be of various forms. However, for illustrative purposes, this portion of the structure may correspond to that shown by the form of the invention particularly illustrated by FIG. 1 of the drawings. Therefore, it need not be further explained at this point. It is suffice to note that the gate operation here also is timed in accordance with the cartridge movement. It is so controlled that the gate is opened or released promptly following cartridge sensing at the sensing station. Also, as in the previously described modification, the gate remains open after sensing for a time period sufficient to permit each cartridge as it is moved along by the belt to come upon the slope path for allocation to one of the storage bins. As in the previously described modification, the cartridge or article normally is moved by gravity on to the slope path whereby as soon as the conveyor means has moved the cartridge so that approximately half the cartridge extends over the conveyor and its drive, the cartridge weight will be sufficient to displace it from the conveyor. After this is done, the arresting gate is returned to its original position to hold the next arriving cartridge of the file array for sensing.

Various modifications of the propsal may, of course, be made without departing from the spirit and scope of the invention as hereinabove disclosed. For example, instead of having notches of different depths space along an edge of the film cartridge for identifying the type of film contained therein, the cartridge may be provided with projections spaced along the edge, said projections varying in height relative to the edges to extend the identification range the same as the different notch depths. Such a modification would merely require a reversal of the disclosed sensing means, e.g., the sensing levers being raised held elevated by prescribed amounts to close $m$ times $n$ switches rather than doing so by dropping below a reference level as in the disclosed embodiment.

I claim:

1. An apparatus for identifying and sorting film cartridges each having identification irregularities positioned at different locations within a selected peripheral distance along one edge of the cartridge in accordance with the type of film contained therein, and comprising:
    a sensing station;
    means for moving the film cartridges individually and in sequential similarly oriented array to and from said sensing station;
    sensing means at said sensing station movable between an operative position, wherein the presence of an identification irregularity in a cartridge moved into said sensing station is engaged and sensed, and an inoperative position, wherein said sensing means is moved from engagement with said cartridge to permit movement of a cartridge to and from said sensing station;
    means responsive to said sensing means to produce a signal indicative of the identification irregularity on each cartridge; and
    means responsive to the produced signal for segregating cartridges according to its type of film contained therein after they are moved from said sensing station.

2. The apparatus set forth in claim 1 wherein film cartridge moving means comprises:
    a continuously moving conveyor on which said cartridges are placed in space relation, and
    means to interrupt movement of the cartridge at the head of the array in the sensing station for sensing.

3. An apparatus according to claim 2, in which the cartridges are spaced along the conveyor from each other by a minimal distance proportioned to the time required for passage of a cartridge past a selected point which is at least equal to that time required for sensing the lead cartridge in the array in arrested position.

4. An apparatus according to claim 1 wherein sensing means comprises:
    a plurality of sensing lever means corresponding in number to the possible number of identification irregularities on the film cartridge and positioned in corresponding relationship therewith, and
    means to cause any one of said lever means to engage any corresponding identification irregularity of a cartridge in its motion-arrested position and thereby produce the signal indicative of the film type contained on said cartridge.

5. An apparatus according to claim 1 in which said cartridge segregating means includes:
    a plurality of cartrdige storage means;
    and sorting means controlled by the produced signal to direct each sensed cartridge to a selected one of said storage means.

6. An apparatus according to claim 1 and including:
    a sloped discharge means positioned approximately at the end of the conveyor means for receiving cartridges subsequent to their sensing and substantially concurrently with the removal of the cartridge-arrest means.

7. An apparatus according to claim 6 and including:
    a plurality of sorting gates located along the sloped discharge means, and each movable between a first state permitting movement of cartridges past the gate position and a second state allocating cartridges to the region of said gate; and
    means responsive to the electrical signal established by the sensing means when sensing a cartridge for moving said sorting gates to said second state, one gate being allocated to each notch position.

8. An apparatus for identifying and sorting film cartridges each having identification notch means positioned at different locations within a selected peripheral distance along an edge of the cartridge in accordance with the type of film contained therein; and comprising:
    a sensing station;
    means to move the cartridges individually in similarly oriented array along a file path to and from the sensing station;
    means to arrest temporarily the motion of the leading cartridge in the file path upon its arrival at the sensing station, the arrested motion being of a time duration to permit sensing;
    a plurality of sensing means at said sensing station corresponding in number to the possible number of notch locations in the cartridge periphery; said sensing means movable between an operative position, wherein they engage a cartridge in the sensing station and at least one thereof enters a notch related thereto in space of that cartridge which is in its arrested position, and an inoperative position, wherein they are disengaged from the cartridge path;
    means synchronized with the cartridge moving means for moving said sensing means to and holding them in their inoperative position at all times except for a time interval starting with the arrival of a cartridge at said sensing station and ending with the sensing of the cartridge to permit a successive cartridge to be moved into and from said sensing station for and after, respectively, sensing; and means activated by the sensing means engaging the cartridge notch means to produce an electrical signal indicative of the space location at which the cartridge identifying notch appears.

9. An apparatus according to claim 8 in which said cartridge moving means comprises a conveyor means for conveying the cartridges to be sensed along a file path between a position of loading and orienting and the sensing station.

10. An apparatus according to claim 9 including means for driving said conveyor means at a substantially uniform speed; and means operated in synchronism with the conveyor drive for controlling the movement of said sensing means between their operative and inoperative positions in time-coordinated relationship to the drive to preclude arresting of the leading cartridge until it is in a position for sensing and to preclude initiating cartridge motion until said sensing means are moved from their operative position.

11. An apparatus according to claim 10 including:

cartridge arresting means movable to and from an operative position in which it engages and stops said lead cartridge on the conveyor in said sensing station; and means operating in substantial synchronism with said last-mentioned means for removing the cartridge-arresting means from its operative position following sensing and for returning the cartridge-arresting means to its operative position following the passage of a previously sensed cartridge therebeyond along the file path.

12. An apparatus according to claim 8, wherein each of the cartridges to be sensed is provided with $m$ different notch locations within a preselected peripheral distance along one edge of each cartridge and wherein each notch extends to one of $n$ preselected depths, and including:

means to move the sensing means adapted for movement into any cartridge notch to a depth corresponding to any one of the $n$ positions subsequent to a sensing of one of the notch locations so that the sorting possibilities for cartridge identification may comprise the product of $m$ possible notch locations multiplied by the $n$ possible notch depths.

13. An apparatus according to claim 12, in which said electrical signal producing means includes a plurality of $m$ times $n$ circuits for selectively feeding current from a power supply, a normally open switch in each of said circuits; and $n$ normally open switches located at $m$ different locations corresponding to the notch location of said cartridges, each of said $n$ switches arranged to connect a different one of said $m$ times $n$ switches to the power supply when it is closed by one of said sensing means entering a notch in a cartridge being sensed; and means for selectively closing said $m$ times $n$ switches in sequence in delayed relation to the closing of said $n$ switches by said sensing means, and means responsive to the completion of one of said $m$ times $n$ circuits to allocate the sensed cartridge to a sorting position related thereto.

14. Mechanism for identifying and classifying articles each having identification notch means positioned at different locations within a selected peripheral distance along an edge of the article and comprising:

a sensing station;

means for moving the articles individually in a similarly oriented array along a file path to said sensing station, a group of sensing means at said sensing station corresponding in number to the possible number of notch locations along the edge of the articles; said group of sensing means movable between an inoperative position, wherein they are removed from engagement with said article at the sensing station, and an operative position wherein they engage the edge of the article located at said sensing station and anyone thereof encountering a notch means will move into engagement therewith;

means for temporarily arresting motion of the leading article in the file path upon its arrival at said sensing station for a time duration to permit sensing;

means responsive to an article being moved into said sensing station for controlling the collective movement of said group of sensing means to their operative positions and for then collectively moving said group of sensing means to their inoperative position after a given time duration necessary for sensing to permit the sensed article to move out of said sensing station and the successive article in the file path to be moved into said sensing station; and means activated by the sensing means engaging the article notch means to produce an electrical signal indicative of the space location at which the article identifying notch means appears.

References Cited

UNITED STATES PATENTS

| | | | |
|---|---|---|---|
| 1,683,249 | 9/1928 | Hanney | 209—75 X |
| 3,021,949 | 2/1962 | Hogg | 209—80 X |

M. HENSON WOOD, JR., *Primary Examiner.*

R. A. SCHACHER, *Assistant Examiner.*